No. 680,270. Patented Aug. 13, 1901.
O. OHLSSON.
CENTRIFUGAL PURIFYING MACHINE.
(Application filed July 24, 1894.)
(No Model.)
Fig. 1.
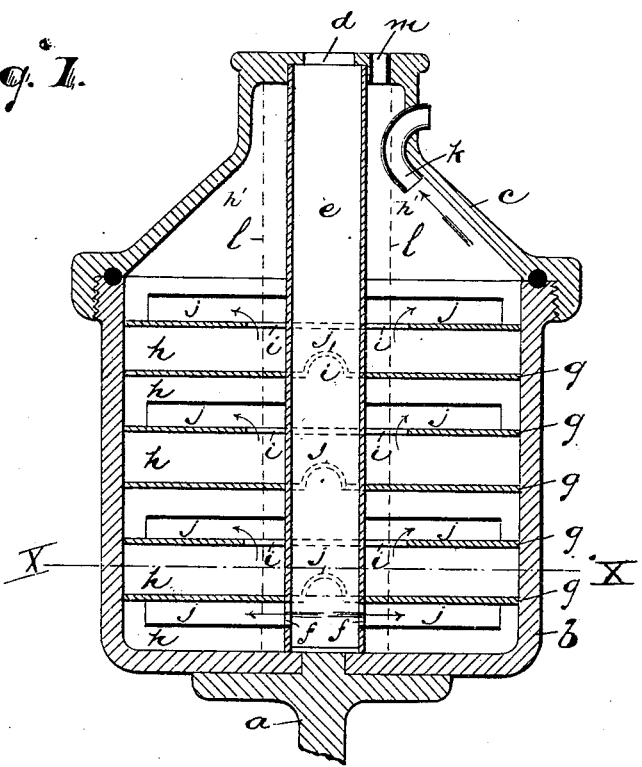
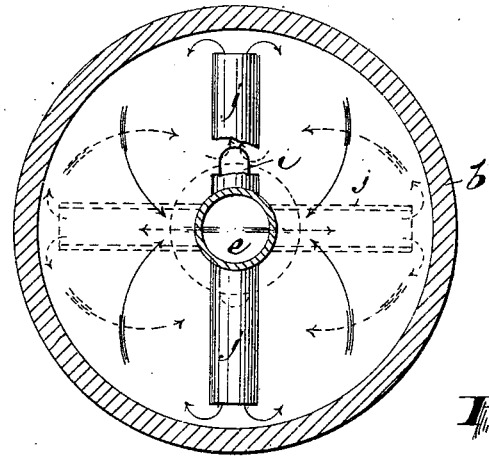
Fig. 2
Witnesses
Robert Sollberger
Louisa Browne
Inventor
Olof Ohlsson,
By Drake, Atty's.

UNITED STATES PATENT OFFICE.

OLOF OHLSSON, OF NEWARK, NEW JERSEY.

CENTRIFUGAL PURIFYING-MACHINE.

SPECIFICATION forming part of Letters Patent No. 680,270, dated August 13, 1901.

Application filed July 24, 1894. Serial No. 518,428. (No model.)

*To all whom it may concern:*

Be it known that I, OLOF OHLSSON, a citizen of the United States, residing at Newark, in the county of Essex and State of New Jersey, have invented certain new and useful Improvements in Centrifugal Purifying-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to cleanse or purify milk by subjecting it to centrifugal action, whereby its impurities may be separated without at the same time causing a separation of the fat particles contained in the milk.

The invention consists of a plurality of plates adapted to fit within the rotary bowl of a centrifugal machine and forming transverse chambers, the chambers being provided with restricted passage-ways leading from near the center to near the periphery, whereby the milk is given a tortuous course through the chambers, moving rapidly outward through the said passage-ways and more slowly inward through the chambers, so as to prevent separation of the fat from the blue milk, while at the same time separation of the impurities from the milk proceeds.

Referring to the accompanying drawings, showing one embodiment of the invention, and in which like letters of reference indicate corresponding parts in each of the figures, Figure 1 is a central vertical section of the improved device; and Fig. 2 is a horizontal section of the same, taken at line $x$.

In said drawings, $a$ indicates a shaft or rotary support for the bowl $b$, the latter being secured upon the upper end of said shaft in any suitable manner. At the top of the bowl the same is provided with a cover $c$, which is centrally open, as at $d$, to admit of the milk being supplied to the bowl. Leading from said opening $d$ to the bottom of the bowl is a vertical supply-pipe $e$, which is open at its lower end, as at $f$, to allow a radially-outward flow of fluid. Within said bowl and encircling the supply-pipe is a series of diaphragms or plates $g$, dividing the space within the bowl into a plurality of transverse chambers $h$. These chambers are provided with tubes or ducts forming restricted passage-ways, which lead from near the center of one chamber to near the periphery of the next chamber. In the form of the invention herein shown the passage-ways are formed of radiating half-tubes secured to the plates and communicating with the apertures $i$ of the plates and opening outward near the outer edge of the plates or near the periphery of the bowl. The first chamber $h$ to receive milk from the supply-pipe $e$ has its passage-ways $j$ in communication with the outlet-openings $f$ of said pipe. The last chamber $h'$, into which the milk passes before issuing from the bowl, is not provided with passage-ways $j$, but has an outlet-port $k$, which leads from a point between the inner and outer milk-walls. This chamber $h'$ has also a normally-closed outlet-port $m$, leading from near the inner milk-wall, which is only opened from time to time for a purpose hereinafter explained.

In operation the milk enters the supply-pipe $e$ and passes thence through the openings $f$ into the first passage-ways $j$. Thence it is delivered outward into the first chamber $h$ near its periphery and passes then inward through the aperture $i$ of said chamber into the next passage-ways $j$, from which it is delivered outward near the periphery of the next chamber $h$, and so on, flowing outward through the restricted passage-ways $j$ and inward through the chambers $h$ until it is finally delivered into the last chamber $h'$, whence it issues from the machine through the outlet-port $k$. In its tortuous course through the chambers to and from the center of the bowl the milk flows rapidly outward through the passage-ways $j$, because they are somewhat restricted. If it were not for these restricted passage-ways, which cause the rapid movement of the milk outward, the fat particles would not flow from the center, but would collect there, while the blue milk would separate from the fat and pass toward the periphery. It is essential to prevent this separation, and this is effectually accomplished by the restricted passage-ways operating to create an increased pressure by confining the milk in a narrow space, and hence causing a more-rapid movement of the milk toward the periphery. The milk flows inward through the chambers h more slowly, but without separating the fat, being driven along by the pressure of milk behind it. The outlet-port k, leading from a point between the inner and outer milk-walls, receives the outflowing milk from all directions in the chamber h', and no separation of the fat takes place in this chamber. While the milk is passing through the chambers h, the heavier impurities gather along the periphery of the bowl in the several chambers; but the very light impurities, such as would float on the surface of the milk at rest, are carried along with the current of milk just as are the fat particles. In the final chamber h', however, these light impurities collect at the inner milk-wall. When it is desired to draw them from the bowl, the outlet-port m is opened and the milk is fed into the pipe e a little faster than before, if necessary, so that the milk at the inner milk-wall in the chamber h' containing these light impurities issues from the port m. When they are withdrawn, the port m is closed. When it becomes necessary, the plates g and pipe e are withdrawn from the bowl for the purpose of removing the impurities that cling to the periphery of the bowl or to the plates.

In the best form of the invention the plates g and pipe e are secured together or otherwise made integral and the passage-ways j formed of half-tubes secured to the plates and the pipe. This makes all the parts of the interior device rigid and readily removable. While I have shown my invention in what I believe to be its best form, yet there are numerous changes which might be made without departing from the spirit thereof. For example, the restricted passage-ways might be formed in various ways, the plates forming the transverse chambers might be variously arranged, a central inlet-pipe might be displaced by other inlet means, and the milk might flow from top to bottom through the chambers. Such changes, it will be readily appreciated, would not be a departure from the invention as herein described and claimed.

What I claim, and desire to secure by Letters Patent, is—

1. A centrifugal machine for purifying milk, comprising a rotary bowl provided with suitable inlet and outlet ports and provided with a series of transverse partitions dividing the interior space of the bowl into a plurality of transverse chambers, said chambers having restricted conduits or ducts extending from near the center of the bowl in one chamber to near the periphery of the bowl in the next chamber, whereby the milk traverses the bowl axially and is given a tortuous course through the chambers, flowing rapidly outward toward the periphery through the restricted conduits or ducts and more slowly inward toward the center through the chambers, whereby the separation of impurities is accomplished without separating the fat particles from the blue milk, substantially as set forth.

2. In a centrifugal machine for purifying milk, the combination of the rotary bowl, a central supply-tube, and a plurality of plates disposed within the bowl and encircling the supply-tube and forming transverse chambers; each of said chambers communicating near its center with one or more tubular conduits or ducts which extend to near the periphery of an adjoining chamber, and a suitable outlet-port for the milk, substantially as set forth.

3. An interior device for a centrifugal purifying-machine, comprising a central supply-tube, a series of transverse plates rigidly secured to said tube and provided with apertures near their center, and tubular conduits or ducts communicating with said apertures and opening near the outer edges of the plates, substantially as set forth.

In testimony that I claim the foregoing I have hereunto set my hand this 18th day of July, 1894.

OLOF OHLSSON.

Witnesses:
  CHARLES H. PELL,
  LOUISA BROWNE.